Figure 1:
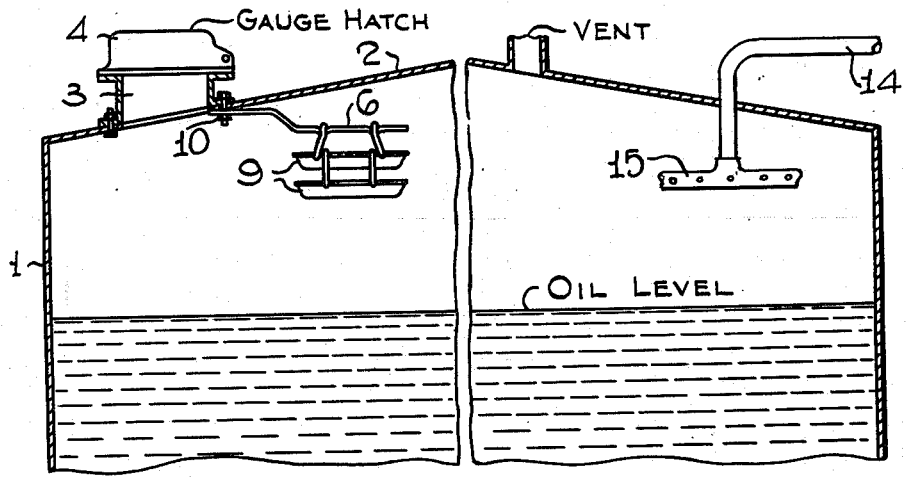

May 26, 1953 A. C. BROYLES 2,639,971
INHIBITING STORAGE TANK CORROSION
Filed Jan. 29, 1949 2 Sheets-Sheet 1

Alvin C. Broyles Inventor
By W. O. Teelman Attorney

Patented May 26, 1953

2,639,971

UNITED STATES PATENT OFFICE 2,639,971

INHIBITING STORAGE TANK CORROSION

Alvin C. Broyles, Tulsa, Okla., assignor to Standard Oil Development Company, a corporation of Delaware Application January 29, 1949, Serial No. 73,647

5 Claims. (Cl. 21—2.5)

The present invention is directed to a method for reducing or minimizing corrosion in vessels containing material which evolves corrosive acidic vapors. The invention relates especially to a novel class of inhibitor compounds which may be added to the vapor space of metal storage tanks to prevent corrosion of the tank. More particularly, the invention is directed to the prevention of corrosive action in the vapor space of metal tanks used for the storing of sour crude petroleum oils. In accordance with the present invention a low concentration of a volatile nitroparaffin is maintained in the vapor space of the tank to be protected.

At the present time in the chemical and related industries it is becoming increasingly important to decrease corrosion losses. A pronounced effort is being made to determine ways in which equipment of all types may be protected against deterioration due to corrosion. In the oil industry in particular it is anticipated that very substantial economic savings may be made in this field. An especially troublesome type of corrosion is that encountered in storage tanks and vessels wherein sour crude petroleum is held for considerable periods of time. In general sufficient acidic vapors, particularly hydrogen sulfide, are evolved by sour crude oil so as to establish in conjunction with oxygen and water vapor contained in the tanks a sufficiently corrosive atmosphere to cause serious damage to the tank, particularly to that portion which encloses the vapor space above the stored liquid and thereby severely limit the life of the tanks.

It has been noted that when sour crude oil is stored in a tank, the vapor in the space above the liquid level will ordinarily contain hydrogen sulfide in volume concentrations lying within the average range of from about 0.2 per cent to about 8 per cent. Normally, the maximum hydrogen sulfide concentration will be about 2 or 3 per cent. During normal operation of the tank, that is during filling and emptying or even during a period when no oil is added to or removed from the tank, air and water vapor will find its way into the vapor space above the liquid. Hydrogen sulfide in the presence of droplets of condensed moisture and particularly in the added presence of air or oxygen is extremely corrosive to the metal surface of the tank and can cause a considerable loss of metal from the inside of the tank in a relatively short period of time.

Extensive study of the problem of corrosion by hydrogen sulfide and similar sulfur-containing gases has revealed that hydrogen sulfide is relatively non-corrosive to metal surfaces even when moisture is present, provided no air or oxygen is present. On the introduction of air or oxygen, however, corrosion rates rise rapidly, and serious corrosion can occur with an oxygen concentration as low as 2% in the presence of hydrogen sulfide.

It has further been noted that an increase in the per cent oxygen concentration has a much greater effect on the corrosion rate for a given hydrogen sulfide concentration than does a similar increase in the per cent of hydrogen sulfide for a given concentration of oxygen. A very severe corrosive condition occurs when 15 to 20 volume per cent oxygen is present and when the hydrogen sulfide concentration is as low as 0.2 per cent. In general it has been found in field operations that when the oxygen concentration is relatively high the hydrogen sulfide concentration will be fairly low so that when the vapor space of a tank contains oxygen in the volume per cent range of about 15 to 20, the hydrogen sulfide concentration will be no higher than 2 or 3 per cent.

The presence of such high oxygen concentrations can readily occur in a storage tank that has not been tightly sealed so that air has more or less free access to the inside of the tank. When the tank has been exposed to the sun or to high atmospheric temperatures during the daytime and then cools off during the night, "breathing" occurs and moist air is drawn into the tank. If the temperature falls below the dew point, droplets of moisture form on the exposed internal surface of the tank and subsequent corrosion occurs as a result of the combined action of this moisture and hydrogen sulfide and oxygen present in the vapor space.

Attempts have previously been made to reduce this corrosion by coating the inside surface of such storage tanks with various protective materials, but this procedure has not proved very successful for various reasons, including insufficient adhesiveness of the coating to the tank surface, solvent action of the stored liquid on the coating, breaks or discontinuities in the coating, prohibitive cost and the like.

Figure 2:
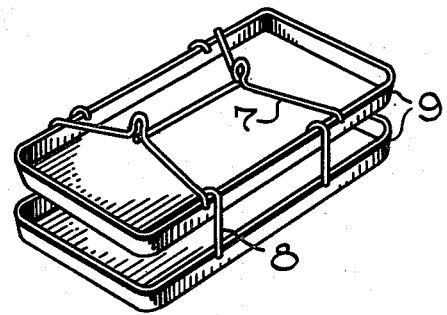
Figure 3:
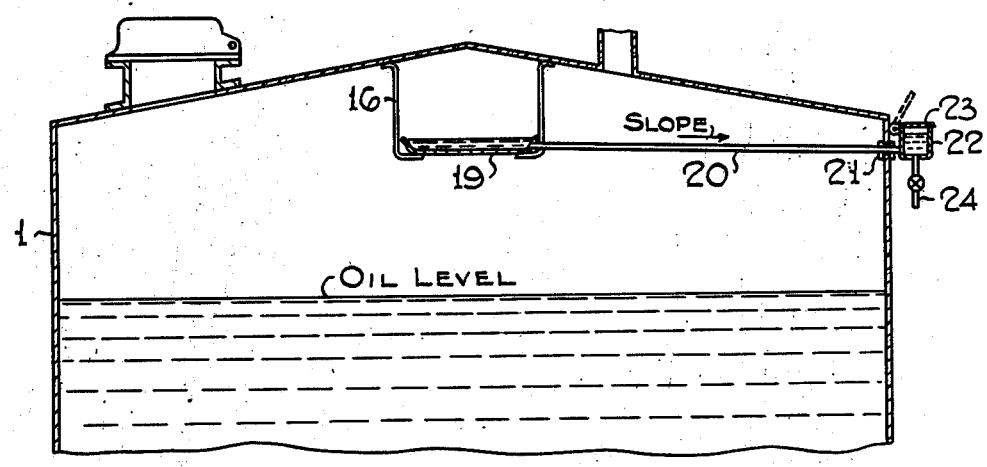

It is an object of the present invention to provide an efficient process for reducing or preventing corrosion in the vapor space of storage tanks containing liquids which evolve corrosive vapors. Other and further objects of the present invention will be apparent from the ensuing description and from the accompanying drawings in which Figs. 1 and 3 represent a crosssectional view of conventional storage tanks containing suitable devices for operation of the present invention, and in which Fig. 2 depicts one suitable form of container for introducing corrosion preventing agents into a storage tank.

In accordance with the present invention it has now been found that corrosion can be reduced or prevented by injecting or otherwise introducing relatively small quantities of a nitroparaffin into the vapor space of the tank. The process is attractive since an extremely low concentration of nitroparaffin is required and since it appears that a definite protective film is placed on the surface of the tank thus lengthening the life of the protection achieved.

The discovery on which this invention is based is that volatile nitroparaffins, in some manner not entirely understood are effective to prevent substantially corrosion of the type indicated. While it is contemplated that higher boiling nitroparaffins would also be suitable for this purpose it is preferred to employ those nitroparaffins which by their nature are sufficiently volatile to form a protective atmosphere at the temperature at which storage tanks are normally maintained. Consequently the preferred inhibitors of the present invention are the three low boiling nitroparaffins, nitromethane, nitroethane, and nitropropane. Each of these compounds is sufficiently volatile so as to provide a suitable protective atmosphere in the storage tank or vessel. In accordance with this invention corrosion inhibition may be achieved using these compounds by introducing into the vapor space of the tank to be protected sufficient nitroparaffin to maintain a concentration of about 0.1 to about 0.5 volume per cent. The nitroparaffin, preferably nitromethane, may be introduced into the vapor space by means of one or more spraying jets, but a more satisfactory method is to place the nitroparaffin in a relatively shallow vessel suspended in the vapor space of the tank so that the nitroparaffin can be allowed to evaporate freely. In order to protect the vapor space of a 300 barrel storage tank in actual service where losses occur through "breathing" and the like, it has been found necessary to provide for the evaporation of from 150 to 450 ml. of nitromethane per day into the vapor space. This can be accomplished by providing inside the tank a vessel in which the nitromethane will have a free surface area of 100 to 250 sq. inches. Nitromethane can be introduced into the shallow evaporation vessel through the gauge hatch of the tank or it may be introduced through a small supply line running into the vessel.

The methods of introducing nitromethane or a related nitroparaffin into a storage tank can be more clearly understood from the accompanying drawings. Fig. 1 represents in cross-section, a conventional oil storage tank equipped with devices for introducing the nitroparaffin inhibitor. In the figure, reference numeral 1 designates a tank having a welded roof 2 provided with a central opening 3 having a hatch cover 4. The tank has an inlet pipe and a drawoff line (neither one shown) for filling and emptying the tank. Suspended from the roof 2 by a suitable bracket 6, is a shallow tray or nest of trays 9, in which may be placed the nitroparaffin inhibitor. This may be introduced through the hatch opening 3. Bracket 6 is pivotally attached to the roof at point 10, so that the bracket and the pans can be swung in to the tank opening for ease of filling or servicing.

Alternatively, the nitroparaffin may be stored in an auxiliary vessel, outside of the tank and pumped into the tank through conduit 14, the nitroparaffin being volatilized through one or more spray devices 15.

One suitable form of evaporating tray for use in the invention is shown in Fig. 2. A plurality of trays 9, may be employed, the top tray being supported by a wire support 7, having locks adapted to slide over bracket 6 shown in Fig. 1. Other wire supports 8 suspend lower trays below the top tray.

Instead of filling the evaporating pan through the hatchway of the tank it is also contemplated to accomplish this from the exterior of the tank as shown in Fig. 3. A pan 19 having suitable evaporating area is supported by suitable means such as brackets 16, attached to the roof of the tank. A pipe or conduit 20 is fitted into pan 19 at a point at or near the bottom of the pan and extends substantially horizontally through a suitable gasket or sealing means 21, to a point on the outside of the tank where it communicates with a filling and inspection chamber 22 fitted with a hinged cover 23. The latter is preferably provided with a small vent hole to ensure that the liquid levels in pan 19 and in chamber 22 will be at the same height. Chamber 22 may be welded or riveted to the tank or may be otherwise attached as by suitable brackets and is preferably placed at about the same level as pan 19. By placing the bottom of chamber 22 at a slightly lower level than the bottom of pan 19, line 20 connecting the bottoms of the two vessels will have a slight downward pitch, thus facilitating the removal of inhibitor through petcock 24 when desired. Suitable reference marks may be provided in chamber 22 to indicate the level of liquid in pan 19, and filling of the system and inspection of the level can be made by lifting hinged cover 23.

Laboratory tests demonstrating the efficiency of nitromethane and related nitroparaffins as inhibitors of corrosion in the vapor space of tanks containing corrosive atmospheres are described in the examples presented below. In determining the corrosion inhibition brought about by the compounds of this invention a glass laboratory tank was employed having an opening at the top. This opening was then closed by a sheet of mild steel held on the top by a sealed ring closure, the assembled tank thus simulating an actual storage tank having a roof of mild steel. Corrosive atmospheres as desired together with inhibitors to be tested were then pumped into this vessel through a suitable opening, and the tank was placed outdoors so as to expose it to temperature changes in order to simulate actual storage tank conditions. It was found that close correlation exists between this type of test and a test conducted with a full size storage tank. The atmosphere employed was one chosen to correspond as closely as possible to the type of atmosphere encountered over a sour crude oil in a storage tank and consisted principally of natural gas containing from 2 to 15% oxygen, about 2% carbon dioxide and about 2% hydrogen sulfide. As stated the vessels employed for the test were placed in an exposed position outdoors and the tests were run during a period of weather when the average temperature produced within the vessel was about 65° F. and varied between a minimum of about 50° F. and a maximum of about 85–90° F. The condensation of water vapor on the mild steel top of the vessel during changes in temperature closely corresponded to the situation in an actual storage tank. In each test run two or three vessels containing the same test atmosphere were employed so that the data presented herein represent an average value of several tests. In each case wherein an inhibitor was added to the particular atmosphere used similar control vessels were also employed corresponding identically in every particular except as to the presence of an inhibitor. The mild steel panel employed in the test was a panel which had been prepared by being freshly sandblasted, to present a clean surface, followed by washing in hot distilled water and drying by contact with acetone and heating in an oven. The weight of the mild steel panel was carefully determined both before and after the tests run.

Example 1

As one example of the present invention an atmosphere comprising 2% hydrogen sulphide, 15% oxygen, 2% carbon dioxide and 81% natural gas was placed in a vessel of the type described. In a similar vessel containing the same atmosphere 0.012 gram of nitromethane per 1800 milliliters of atmosphere was placed. During the test the stated concentration of nitromethane was added daily. At the end of three days it was found that in vessels into which nitro-methane had been introduced the steel panels showed a weight loss of 27.9 milligrams per sq. decimeter per day. In vessels containing the same atmosphere but without added nitromethane the panels showed a weight loss of 267.2 milligrams per sq. decimeter per day. On a percentage basis it can be concluded that there was $$\frac{267.2 - 27.9}{267.2} \times 100$$

or 89.6% retardation of corrosion.

Example 2

As a further example of this invention a similar test was run employing nitroethane as the inhibitor. The concentration of nitroethane maintained was 0.011 gram per 1800 milliliters of atmosphere. At the end of 3 days it was found that the steel top of the vessel containing nitroethane had lost 79.1 milligrams per sq. decimeter per day while that of a control vessel had lost 267.2 milligrams per sq. decimeter per day. These data give a calculated corrosion retardation figure of 70.4%.

Example 3

As a further example of this invention similar tests were run employing nitropropane as the inhibitor. In this case 0.16 gram of nitropropane was employed for each 1800 milliliters of atmosphere. All other conditions of the test were as indicated above with the exception that the test period was 1 day rather than 3 days. The steel panels employed showed a weight loss without the inhibitor protection of 192.7 milligrams per sq. decimeter per day as against a weight loss of 44.7 milligrams per sq. decimeter per day in the case where the vessel contained the nitropropane. These data show a corrosion retardation of 76.8%.

Example 4

In order to determine whether or not a definite protective film is in some manner deposited on the surface of the tank to be protected, prolonged tests were run during which the corrosive atmosphere was frequently changed, but the inhibiting nitroparaffin employed was added only at the beginning of the test so that subsequent changes of the atmosphere substantially removed any free inhibitor vapors. For example, a 5 day test was made in which inhibitor was added only at the beginning of the test and in which the corrosive atmosphere was then changed on the third day of the test. The inhibitor employed was nitromethane and the concentration used was 0.012 gram per 1800 milliliters of atmosphere. It was found that at the end of 5 days the steel panel in the vessel which had been inhibited showed a weight loss of 8 milligrams per square decimeter per day while a control panel in a vessel in which no inhibitor was added showed a weight loss of 83.4 milligrams per square decimeter per day. These data gave a corrosion retardation figure of 90.4%. It will be noted by comparison of this test with the 3 day test reported in Example 1 that essentially the same corrosion inhibition was obtained, even though two days of the test were conducted substantially without the presence of any added nitromethane. It therefore appears that during the initial 3 days of the test a more or less permanent corrosion inhibition of the mild steel was attained so that on eliminating nitromethane from the system corrosion was in some manner still prevented. It is possible that a tightly adherent film is somehow deposited on the surface of the mild steel panel. It should be understood, however, that this invention is not to be limited by any theory of its mode of operation.

Example 5

In a further test which was conducted for a period of 7 days, the atmosphere was changed 4 times, the corrosion inhibitor being introduced only on the first day. Again nitromethane was employed as the inhibitor at a concentration of 0.012 gram per 1800 milliliters of atmosphere. After the first day of the test as indicated the atmosphere was completely changed, effectively eliminating substantially all of the free nitromethane from the system. This procedure was repeated 3 times during the test, namely on the 4th, 5th, and 6th days. Controls were also run in which the identical procedure was carried out except that no nitromethane was added at any time to the vessels. At the end of 7 days it was found that the steel panel in the vessel which had contained inhibitor had lost 158 milligrams per sq. decimeter per day while the control steel panel had lost 465 milligrams per sq. decimeter per day. The corrosion retardation was therefore, 66.1%. While it is to be noted that the same degree of corrosion inhibition was not obtained as in the case where nitromethane is constantly maintained in the vessel nevertheless it is to be observed that the corrosion was substantially cut down. Again it appears certain from these data that a definite protective film was placed on the mild steel panel in the initial part of the test which was probably not entirely displaced even at the end of the test.

The effectiveness of the present invention is further illustrated by actual field tests that have been conducted on 300 barrel steel storage tanks. In these tests the storage tanks were maintained in normal operation for storing an Arkansas sour crude oil, which on analysis was found to contain from about 2 to about 4 cubic feet of evolvable hydrogen sulfide per barrel. Test periods were maintained for a sufficient time to average out fluctuations in the amount of oil each tank contained. In other words, the tests were conducted for a sufficiently long period of time so that the tanks at some time would be full or nearly full and at other times would be empty. On the average each tank was alternately filled and emptied in about 4 or 5 day cycles. Three tanks were employed and in the vapor space of each tank were placed carefully weighed sandblasted steel panels.

The test panels were bolted to the manhole cover in the roof of the tank in order that they would be given the fullest opportunity to accumulate condensed moisture in the same manner as the walls and roof of the tank and thus be subjected to the same corrosive conditions as the latter surfaces. After 48 days of exposure the test panels were again weighed to determine control corrosion rates. Then weighed steel panels were again inserted in the tanks and nitromethane vapors were introduced into the vapor space in each tank by placing liquid nitromethane in shallow pans suspended from the roof of each tank and allowing it to evaporate. About 100 milliliters of nitromethane evaporated in each tank each day. The following results were obtained at the end of 10 days.

Results of Nitromethane Field Test

| Tank Number | Control Corrosion Rate, Mdd (48 days' Exposure) | Corrosion Rate, Mdd (Nitromethane Treated, 10 days) | Percent Retardation |
| --- | --- | --- | --- |
| 1 | 119 | 31 | 74 |
| 2 | 129 | 6 | 95 |
| 3 | 80 | 1 | 99 |

The increase in per cent retardation from Tank 1 to Tank 3 may be explained by the arrangement of the vent lines: vapors leaving Tank 1 pass through Tank 2, then through Tank 3 to the atmosphere.

The results show that appreciable retardation of corrosion may be obtained by introducing 100 milliliters of nitromethane per day into the vapor space of a 300 barrel storage tank containing sour crude oil and that the corrosion inhibition improves as the concentration of nitromethane is raised above that figure.

Depending on the particular conditions encountered, from about 150 to about 450 milliliters of nitromethane per day will protect a storage tank of this size. This is equivalent to about 0.2 to about 0.7 lb. of nitromethane per day per 1000 cubic feet of storage capacity.

Other field tests revealed that 95 to 99% retardation of corrosion could be effected by maintaining a concentration of 0.2 to 0.4 volume percent nitromethane in the vapor space of the tank.

It will thus be seen that in accordance with this invention steel tanks employed for the storing of sour crude oils may be protected against corrosion particularly in the vapor space thereof, by maintaining in the vapor space a concentration of about 0.2 lb. to about 0.7 lb. of a volatile nitroparaffin per 1000 cubic feet of storage capacity. Effective corrosion protection can likewise be obtained by maintaining a concentration of 0.1 to 0.5 volume percent and preferably 0.2 to 0.4 volume percent of the nitroparaffin in the vapor space. The volatile nitroparaffin is preferably selected from the class consisting of nitromethane, nitroethane and nitropropane, nitromethane being the preferred inhibitor. Introduction of the nitroparaffin may be accomplished in any desired manner, for example, a vessel containing liquid nitroparaffin and having an open top may be suspended in the vapor space of the tank to be protected. Again if desired, the nitroparaffin may be positioned in an auxiliary vessel outside the tank and its vapors conducted from this vessel into the tank to supply the nitroparaffin atmosphere. The auxiliary vessel may or may not be heated somewhat as desired to insure volatilization of the nitroparaffin. The essential requirement is that the vapor space be supplied with nitroparaffin in the concentration reported above.

What is claimed:

1. A method for minimizing corrosion in a metal vessel which has a vapor space and carries a material evolving acidic vapors which comprises maintaining in said vapor space a volatile nitroparaffin selected from the class consisting of nitromethane, nitroethane, and nitropropane.

2. A method for minimizing corrosion in metal storage tanks for oil which evolves corrosive sulphur-containing vapors which comprises maintaining in the vapor space of said tanks a concentration of from about 0.1 to about 0.5 volume percent of vapors of a nitroparaffin selected from the class consisting of nitromethane, nitroethane, and nitropropane.

3. Method according to claim 2 in which a concentration of from about 0.2 to about 0.4 volume percent of nitromethane is employed.

4. A method for minimizing corrosion in a metal storage tank for oil which comprises suspending in a vapor space of said tank an open vessel containing a volatile nitroparaffin selected from the class consisting of nitromethane, nitroethane, and nitropropane.

5. Method according to claim 4 in which the open vessel provides sufficient surface area to evaporate 0.2–0.7 lb. of nitroparaffin per day per 1000 cubic feet of storage capacity of said tank.

ALVIN C. BROYLES.

References Cited in the file of this patent
UNITED STATES PATENTS

| Number | Name | Date |
| --- | --- | --- |
| 2,185,238 | Whaley | Jan. 2, 1940 |
| 2,304,950 | Parker | Dec. 15, 1942 |
| 2,326,968 | Pomeroy | Aug. 17, 1943 |
| 2,330,051 | Heidt | Sept. 21, 1943 |
| 2,357,559 | Smith | Sept. 5, 1944 |